Patented July 3, 1934

1,964,848

UNITED STATES PATENT OFFICE 1,964,848

PLASTIC

Taliaferro J. Fairley, Alexandria, La., assignor, by direct and mesne assignments, of one-half to W. J. Hunter and one-half to Mary P. Hunter, both of Shreveport, La.

No Drawing. Application July 6, 1931, Serial No. 549,120

2 Claims. (Cl. 106—23)

The present invention relates to the production of a solid oil or cement produced by treating the product obtained by distilling scrap or vulcanized rubber in accordance with the invention described in my application entitled "Process of treating rubber" executed concurrently herewith, filed July 6, 1931, Serial No. 549,118.

The distillate employed comprises the fractions obtained by distilling vulcanized rubber to substantial dryness or up to a temperature of about 400° C., condensing all of the resultant vapors, and collecting the various fractions as a single distillate, or the distillate may comprise those fractions obtained by distilling vulcanized rubber to substantial dryness in a vacuum using lower temperatures. In each case, the fractions are condensed and collected as a single distillate.

The above are simply examples of the solvent since it will be noted that any of the processes set forth in my said co-pending application may be utilized.

The solid oil or cement obtained by this invention is useful as a coating means in the preparation of oil cloth, floor cloth, and other materials having a manufactured base, and likewise can be used in producing a moldable composition or a sheeted structure, such as linoleum.

In carrying out the invention, the distillate or oil obtained in accordance with my aforesaid application is mixed with one or more or a group of fatty acids of which stearic, palmetic, oleic, linolic and linolenic are representative.

The mass is then heated for substantially thirty minutes more or less at a temperature up to 200° C. and there is then added an alkali, preferably lime, whereupon the heating is continued for possibly fifteen to thirty minutes longer at the same temperature.

While I have referred to the particular alkali added as lime, it will be understood that other oxides, hydroxides and carbonates of the alkali and alkali earth metals may be utilized. Likewise it will be understood that various others of the fatty acids coming within the respective groups of those named may be employed.

At the end of the heating period, it will be found that the resultant mass has been oxidized, and by permitting it to cool, a so-called solid oil or cement having a gelatinous or plastic character results.

The fatty acids appear to act as oxidizing agents in the presence of heat, and the alkali appears to render the mass solid and likewise renders it insoluble in the presence of water and most acids, where lime (CaO) or similar alkali is used.

The resultant product, as stated, is of a gelatinous nature, and in order to produce a product similar to linoleum, there will be incorporated cork or wood fibre, oxides or cobalt, manganese, or lead, or resinates thereof, as well understood in the art. Also some gums, such as gum tragacanth may be employed to overcome brittleness. Of course a suitable pigment may also be added and the resultant mixture can then be prepared in sheeted form after the manner of the preparation of linoleum. By reason of the excellent drying properties produced by the reaction of the fatty acid and alkali with my distillate or oil, the resultant sheeted product will dry very rapidly, and this of course is accelerated by the presence of litharge or other oxide employed. In making up the plastic mass, I utilize for a definite quantity of my distillate or oil, 10% by volume of fatty acid, and approximately 5% by weight of alkali. It will be understood that these percentages may be departed from more or less as occasion requires, but are substantially the amounts employed in most cases.

The plastic mass produced may be rolled or spread upon any suitable base, as for instance a base of cloth or leather, to produce oil cloth or patent leather, and in fact may be employed as a coating or covering in a variety of applications.

In the manufacture of patent leather or oil cloth, various ingredients may be added, such as driers in the form of oxides, as above mentioned, gums, resins, fillers and pigments. These ingredients are, of course, well known in the manufacture of the particular article.

I claim:

1. A solid oil or cement comprising the reaction product of a rubber distillate obtained by distilling vulcanized rubber to dryness and condensing all of the resultant vapors as a single distillate, a fatty acid and an alkali in the presence of heat.

2. The process of making a solid oil or cement comprising heating a mass consisting of the distillate obtained by distilling vulcanized rubber to dryness and collecting all of the resultant vapors as a single distillate, a fatty acid, and an alkali, and cooling the reaction product.

TALIAFERRO J. FAIRLEY.